UNITED STATES PATENT OFFICE.

JOSÉ BAXERES DE ALZUGARAY, OF NEW YORK, N. Y.

EXTRACTING PRECIOUS METALS FROM THEIR ORES.

No. 892,110.  Specification of Letters Patent.  Patented June 30, 1908.

Application filed August 16, 1905. Serial No. 274,505.

*To all whom it may concern:*

Be it known that I, JOSÉ B. DE ALZUGARAY, a citizen of the Argentine Republic, and a resident at Wall Street Exchange Building, in the city of New York, State of New York, have invented certain new and useful Improvements in Extracting Precious Metals From Their Ores.

My invention relates to an improvement in the art of extracting gold, platinum metals and silver, from ores containing them, by the use of hydrogen fluorid; and it consists more particularly in the method I have discovered for utilizing this agent to the best advantage.

In the practice of the methods now commonly employed in the recovery of precious metals from their ores, one of the greatest difficulties experienced consists in the refractory nature of most ores, which produces considerable loss in the saving of the metals combined with sulfur, tellurium, silicon and other metalloids.

In utilizing this invention, to set the precious metals contained in the several mineral combinations free, and therefore easily amenable to the several processes of lixiviation, imbibition and smelting, I treat the ores reduced to coarse powder by means of hydrogen fluorid produced by the decomposition of any fluorin compound by sulfuric acid or by any of the salts or compounds evolving sulfuric acid.

To treat any kind of ore containing precious metals by the foregoing method, I place the ore in any appropriate furnace or vessel and mix it, intimately with a suitable proportion of fluorspar, or of any fluorin compound and with a sulfate or compound evolving sulfuric acid, which reacts on the fluorin compound, evolving hydrogen fluorid which reacts on the ore, disintegrating it with the evolution of silicon fluorid, which can be recovered by passing the gaseous compound through a condenser in contact with water, hydrofluorsilicic acid or with a suitable reagent.

Instead of evolving hydrogen fluorid within the mass of ore and the mixture of reagents as heretofore described, the same result may be attained by generating gaseous hydrogen fluorid in an independent apparatus and causing it to pass through the masses of ore to be treated by this method.

Once the ore has been submitted to the action of hydrogen fluorid as described, the metallic contents are set free, and the recovery of the precious metals by any of the usual processes, becomes an easy matter.

In the practice of this invention, this method can be worked without the agency of heat, but in many instances it will be useful to heat the mixture of ore and reagents, which will intensify the reaction. Before treating the ore by this method, it may be roasted, although this preliminary operation may be dispensed with.

What I claim as my invention is:—

1. The improved process which consists in subjecting ores containing precious metals to the action of hydrogen fluorid in the gaseous state, thus rendering the metals free from their combination with refractory elements and therefore easy to recover by any of the usual methods.

2. The improved process of treating ores containing gold, silver, platinum and metals of the platinum group, by mixing them with a suitable proportion of a hydrogen fluorid evolving compound, formed of a mixture of fluorin and a sulfuric acid evolving compound.

3. The improved method of treating ores containing precious metals, with the purpose of recovering gold, silver and platinum therefrom, which consists in mixing the ore with a suitable proportion of a fluorin compound and a sulfuric acid evolving compound, heating together the mixture of ore and hydrogen fluorid evolving compound, and subsequently recovering the precious metals by any of the usual methods.

4. The improved process of treating ores containing precious metals, which consists in subjecting the ores in a crude state to hydrogen fluorid in the gaseous state, thus rendering the metals free from their combination with refractory elements and therefore easy to recover by any of the usual methods.

5. The method which consists in treating ores with hydrogen fluorid in the gaseous state to evolve silicon fluorid, passing the silicon fluorid through a condenser in contact with water to form hydrofluorsilicic acid, and repeating the process by combining the hydrofluorsilicic acid with sulfuric acid to evolve the hydrogen fluorid.

In testimony whereof I have signed my name to this specification in the presence of two subscribing witnesses.

JOSÉ BAXERES DE ALZUGARAY.

Witnesses:
J. F. LESTER,
MARY CRAWLEY.